(12) United States Patent  (10) Patent No.: US 8,954,089 B2
Werner et al.  (45) Date of Patent: Feb. 10, 2015

(54) POSITIONING LTE WIRELESS BASE STATIONS USING AGGREGATED OTDOA ASSISTANCE DATA

(75) Inventors: Benjamin A. Werner, San Carlos, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 13/487,029

(22) Filed: Jun. 1, 2012

(65) Prior Publication Data

US 2013/0321210 A1  Dec. 5, 2013

(51) Int. Cl.
H04W 24/00 (2009.01)
(52) U.S. Cl.
USPC .................. 455/456.1; 455/404.2; 455/422.1; 455/456.3; 455/414.1
(58) Field of Classification Search
CPC ....... H04W 64/00; H04W 4/02; H04L 9/0872
USPC ........... 455/456.1, 404.2, 422.1, 456.3, 414.1
See application file for complete search history.

(56) References Cited

U.S. PATENT DOCUMENTS

| | | | |
|---|---|---|---|
| 7,127,257 B2 | 10/2006 | Riley et al. | |
| 7,257,413 B2 | 8/2007 | Sheynblat | |
| 7,359,706 B2 | 4/2008 | Zhao | |
| 7,383,049 B2 | 6/2008 | Deloach, Jr. et al. | |
| 7,486,934 B2 | 2/2009 | Tanoue | |
| 7,639,179 B2 | 12/2009 | Hansen et al. | |
| 8,112,096 B2 | 2/2012 | Mazlum et al. | |
| 8,213,957 B2 | 7/2012 | Bull et al. | |
| 8,244,275 B2 | 8/2012 | Islam | |
| 8,433,339 B2 | 4/2013 | Soliman | |
| 2003/0125046 A1 | 7/2003 | Riley et al. | |
| 2008/0274750 A1 | 11/2008 | Carlson et al. | |
| 2010/0273451 A1* | 10/2010 | Bergstrom et al. | 455/411 |
| 2010/0279707 A1 | 11/2010 | Fischer et al. | |
| 2010/0331009 A1 | 12/2010 | Krishnamurthy et al. | |
| 2010/0331013 A1 | 12/2010 | Zhang | |
| 2011/0039576 A1 | 2/2011 | Prakash et al. | |

(Continued)

FOREIGN PATENT DOCUMENTS

WO 2011019917 2/2011
WO 2011097760 A1 8/2011

OTHER PUBLICATIONS

International Search Report and Written Opinion—PCT/US2013/038264—ISA/EPO—Nov. 18, 2013.

(Continued)

*Primary Examiner* — Nghi H Ly
(74) *Attorney, Agent, or Firm* — Silicon Valley Patent Group LLP

(57) ABSTRACT

An apparatus and method for building a base station almanac at a non-carrier location server is shown. A mobile device cooperates by informing the non-carrier location server of observed time difference of arrival (OTDOA) assistance data it receives. The non-carrier location server collects enough OTDOA assistance data through crowd souring or spoofing to generate an OTDOA library. The non-carrier location server using the OTDOA library to generate a base station almanac. Once created, non-carrier location server uses the base station almanac to provide assistance data to mobile devices without assistance from the carrier. Also, a mobile device may use the base station almanac to determine transmission timing between itself and neighboring and distant base stations.

44 Claims, 11 Drawing Sheets

(56) References Cited

U.S. PATENT DOCUMENTS

| | | |
|---|---|---|
| 2011/0057836 A1 | 3/2011 | Ische et al. |
| 2011/0059756 A1 | 3/2011 | Moeglein et al. |
| 2011/0207470 A1 | 8/2011 | Meredith et al. |
| 2012/0040696 A1 | 2/2012 | Siomina et al. |
| 2012/0052883 A1 | 3/2012 | Austin et al. |
| 2012/0094688 A1 | 4/2012 | Gravely et al. |
| 2012/0165012 A1 | 6/2012 | Fischer et al. |
| 2012/0252463 A1 | 10/2012 | Zou et al. |
| 2013/0023285 A1 | 1/2013 | Markhovsky et al. |
| 2013/0045759 A1 | 2/2013 | Smith |
| 2013/0324163 A1 | 12/2013 | Werner et al. |

OTHER PUBLICATIONS

Partial International Search Report and Written Opinion—PCT/US2013/038264—ISA/EPO—Oct. 10, 2013.
"Universal Mobile Telecommunications System (UMTS); Stage 2 Functional Specification of Location Services in UTRAN (3GPP TS 25.305 version 3 . 3.0 Release 1999); ETSI TS 125 305", IEEE, Lis, Sophia Antipolis Cedex, France, vol. 3-R2, No. V3.3.0, Sep. 1, 2000, XP014008650, ISSN: 0000-0001, Sections 6.6.4.1.3 and 9.

* cited by examiner

POSITIONING LTE WIRELESS BASE STATIONS USING AGGREGATED OTDOA ASSISTANCE DATA

CROSS-REFERENCE TO RELATED APPLICATIONS

This application is related to U.S. application Ser. No. 13/487,006, entitled "Obtaining timing of LTE wireless base stations using aggregated OTDOA assistance data," which was filed Jun. 1, 2012, is assigned to the assignee hereof, and is expressly incorporated herein by reference.

BACKGROUND

I. Technical Field

This disclosure relates generally to systems, apparatus and methods for communicating assistance information using non-carrier or third party servers, and more particularly to locating base stations and mobile devices using Observed Time Difference of Arrival (OTDOA) assistance data.

II. Background

Users of mobile devices and network operators often desire to know where a mobile device is located. Although, mobile devices sometimes include a global positioning satellite (GPS) system or other global navigation satellite system (GNSS) to estimate a position, many mobile devices do not contain satellite navigation hardware. In other instances, the inadequate availability of satellite signals at a location or prolonged satellite signal acquisition and capture durations may limit location determination. In some of these cases, a carrier may provide assistance data to speed acquisition of satellite signals and/or provide information about terrestrial signals from base stations, access points, micro-cells, pico-cells, femto-cells and other terrestrial transmitters. Some networks provide assistance data in the form of base station locations so mobile devices may be found by trilateration.

Base stations conforming to the Long-Term Evolution (LTE) standard provide expected OTDOA measurements. The base stations are also known as Evolved Node B (e-NB) stations. OTDOA pertains to the received time difference between signals from two or more cells received at a mobile device. In LTE based positioning using OTDOA, a server may provide a mobile device with a list of potential cells to search. The UE may measure and report OTDOA for signals received from the detected cells. For further information on OTDOA signals, see U.S. Application Ser. No. 61/492,742, entitled "Hybrid positioning using LTE's OTDOA and GNSS measurements," which was filed on Jun. 2, 2011, is assigned to the assignee hereof, and U.S. application Ser. No. 13/287,882, entitled "Hybrid positioning using synchronous and asynchronous techniques," which was filed on Nov. 2, 2011, and is assigned to the assignee hereof.

By using the reported measurements for at least two detected e-NBs in addition to the serving e-NB, the location of the mobile device can be trilaterated. For example, the time differences may be used by the mobile device or a carrier's positioning server to derive curves that intersect at or near the mobile device to determine the position of the mobile device.

When a mobile device relies on a server for assistance data or positioning computations, these servers are carrier-provided servers in which the user's network provider may control and charge for access to its location server. Thus, the carrier maintains sole possession for providing assistance data to a mobile device. Therefore, to ensure high availability and redundancy in case of outages and for other economic reasons, there is a need for a third-party location server disassociated from, unregulated and not controlled by the network carrier.

SUMMARY

Disclosed are apparatus, methods and systems for providing third-party assistance data related to communication networks, including LTE networks, and time difference of arrival messaging.

According to some aspects, disclosed is a method in a mobile device to facilitate the building of a base station almanac, the method comprising: receiving, at the mobile device, observed time difference of arrival (OTDOA) assistance data from a first location server; and sending, from the mobile device, the OTDOA assistance data to a second location server for building the base station almanac.

According to some aspects, disclosed is a method in a mobile device for facilitating building of a base station almanac, the mobile device comprising: a receiver; and a processor comprising a memory and coupled to the receiver; wherein the memory comprises code to be executed by the processor for: receiving, at the mobile device, observed time difference of arrival (OTDOA) assistance data from a first location server; and sending, from the mobile device, the OTDOA assistance data to a second location server for building the base station almanac.

According to some aspects, disclosed is a method in a mobile device for facilitating building of a base station almanac, the mobile device comprising: means for receiving, at the mobile device, observed time difference of arrival (OTDOA) assistance data from a first location server; and means for sending, from the mobile device, the OTDOA assistance data to a second location server for building the base station almanac.

According to some aspects, disclosed is a method in a computer-readable storage medium including non-transient program code stored thereon for: receiving, at a mobile device, observed time difference of arrival (OTDOA) assistance data from a first location server; and sending, from the mobile device, the OTDOA assistance data to a second location server for building a base station almanac.

According to some aspects, disclosed is a method in a method in a non-carrier location server for building a base station almanac, the method comprising: receiving, at the non-carrier location server, observed time difference of arrival (OTDOA) assistance data and a seed location from a mobile device, wherein the OTDOA assistance data was received by the mobile device from a first location server distinct from the non-carrier location server; and saving, at the non-carrier location server, the OTDOA assistance data and the seed location to a non-carrier OTDOA library for building the base station almanac; wherein the OTDOA assistance data comprises an expected time difference of arrival of signals at a seed location from a pair of base stations.

According to some aspects, disclosed is a method in a non-carrier location server for building a base station almanac, the non-carrier location server comprising: means for receiving, at the non-carrier location server, observed time difference of arrival (OTDOA) assistance data and a seed location from a mobile device, wherein the OTDOA assistance data was received by the mobile device from a first location server distinct from the non-carrier location server; and means for saving, at the non-carrier location server, the OTDOA assistance data and the seed location to a non-carrier OTDOA library for building the base station almanac;

wherein the OTDOA assistance data comprises an expected time difference of arrival of signals at a seed location from a pair of base stations.

According to some aspects, disclosed is a method in a non-carrier location server comprising a processor and a memory wherein the memory includes code to be executed by the processor for: receiving, at the non-carrier location server, observed time difference of arrival (OTDOA) assistance data and a seed location from a mobile device, wherein the OTDOA assistance data was received by the mobile device from a first location server distinct from the non-carrier location server; and saving, at the non-carrier location server, the OTDOA assistance data and the seed location to a non-carrier OTDOA library for building a base station almanac; wherein the OTDOA assistance data comprises an expected time difference of arrival of signals at a seed location from a pair of base stations.

According to some aspects, disclosed is a method in a computer-readable storage medium including non-transient program code stored thereon for: receiving, at a non-carrier location server, observed time difference of arrival (OTDOA) assistance data and a seed location from a mobile device, wherein the OTDOA assistance data was received by the mobile device from a first location server distinct from the non-carrier location server; and saving, at the non-carrier location server, the OTDOA assistance data and the seed location to a non-carrier OTDOA library for building a base station almanac; wherein the OTDOA assistance data comprises an expected time difference of arrival of signals at a seed location from a pair of base stations.

According to some aspects, disclosed is a method in a method in a non-carrier location server comprising a non-carrier observed time difference of arrival (OTDOA) library and for building a base station almanac, the method comprising: extracting OTDOA assistance data and seed locations from the non-carrier OTDOA library, wherein the OTDOA assistance data comprises an expected time difference of arrival of signals at a seed location from a pair of base stations; computing locations from the OTDOA assistance data, wherein the locations comprise a location for each base station of the pair of base stations; and saving the locations to the base station almanac.

According to some aspects, disclosed is a method in a non-carrier location server for building a base station almanac, the non-carrier location server comprising: a non-carrier observed time difference of arrival (OTDOA) library; and processor and a memory comprising code in the memory to be executed by the processor for: extracting OTDOA assistance data and seed locations from the non-carrier OTDOA library, wherein the OTDOA assistance data comprises an expected time difference of arrival of signals at a seed location from a pair of base stations; computing locations from the OTDOA assistance data, wherein the locations comprise a location for each base station of the pair of base stations; and saving the locations to the base station almanac.

According to some aspects, disclosed is a method in a non-carrier location server for building a base station almanac, the non-carrier location server comprising: means for extracting OTDOA assistance data and seed locations from the non-carrier OTDOA library, wherein the OTDOA assistance data comprises an expected time difference of arrival of signals at a seed location from a pair of base stations; means for computing locations from the OTDOA assistance data, wherein the locations comprise a location for each base station of the pair of base stations; and means for saving the locations to the base station almanac.

According to some aspects, disclosed is a method in a non-carrier location server for building a base station almanac, comprising a processor and a memory coupled to a non-carrier observed time difference of arrival (OTDOA) library, wherein the memory includes code to be executed by the processor for: extracting OTDOA assistance data and seed locations from the non-carrier OTDOA library, wherein the OTDOA assistance data comprises an expected time difference of arrival of signals at a seed location from a pair of base stations; computing locations from the OTDOA assistance data, wherein the locations comprise a location for each base station of the pair of base stations; and saving the locations to the base station almanac.

According to some aspects, disclosed is a method in a computer-readable storage medium including non-transient program code stored thereon to be executed by a processor for: extracting observed time difference of arrival (OTDOA) assistance data and seed locations from a non-carrier OTDOA library, wherein the OTDOA assistance data comprises an expected time difference of arrival of signals at a seed location from a pair of base stations; computing locations from the OTDOA assistance data, wherein the locations comprise a location for each base station of the pair of base stations; and saving the locations to a base station almanac.

According to some aspects, disclosed is a method in a position determination method in a mobile device, the position determination method comprising: sending a coarse location from the mobile device to a non-carrier location server, wherein: the non-carrier location server is distinct from a network providing service to the mobile device and distinct from a carrier's location server that offers service to the mobile device, and the non-carrier location server comprises a non-carrier observed time difference of arrival (OTDOA) library and a base station almanac; receiving, at the mobile device, at least part of the base station almanac from the non-carrier location server, wherein the base station almanac was derived at least in part from observed time difference of arrival (OTDOA) assistance data from the carrier's location server; and computing a position estimate of the mobile device based on the at least part of the base station almanac.

According to some aspects, disclosed is a method in a mobile device comprising a transmitter and receiver; a processor comprising a memory and coupled to the transmitter and to the receiver; wherein the memory comprises code to be executed by the processor for: sending a coarse location from the mobile device to a non-carrier location server, wherein: the non-carrier location server is distinct from a network providing service to the mobile device and distinct from a carrier's location server that offers service to the mobile device, and the non-carrier location server comprises a non-carrier observed time difference of arrival (OTDOA) library and a base station almanac; receiving, at the mobile device, at least part of the base station almanac from the non-carrier location server, wherein the base station almanac was derived at least in part from observed time difference of arrival (OTDOA) assistance data from the carrier's location server; and computing a position estimate of the mobile device based on the at least part of the base station almanac.

According to some aspects, disclosed is a method in a mobile device configured for position determination operations, the mobile device comprising: means for sending a coarse location from the mobile device to a non-carrier location server, wherein: the non-carrier location server is distinct from a network providing service to the mobile device and distinct from a carrier's location server that offers service to the mobile device, and the non-carrier location server comprises a non-carrier observed time difference of arrival (OT- DOA) library and a base station almanac; means for receiving, at the mobile device, at least part of the base station almanac from the non-carrier location server, wherein the base station almanac was derived at least in part from observed time difference of arrival (OTDOA) assistance data from the carrier's location server; and means for computing a position estimate of the mobile device based on the at least part of the base station almanac.

According to some aspects, disclosed is a method in a non-transitory computer-readable storage medium comprising program code stored thereon to be executed by a processor for: sending a coarse location from a mobile device to a non-carrier location server, wherein: the non-carrier location server is distinct from a network providing service to the mobile device and distinct from a carrier's location server that offers service to the mobile device, and the non-carrier location server comprises a non-carrier observed time difference of arrival (OTDOA) library and a base station almanac; receiving, at the mobile device, at least part of the base station almanac from the non-carrier location server, wherein the base station almanac was derived at least in part from observed time difference of arrival (OTDOA) assistance data from the carrier's location server; and computing a position estimate of the mobile device based on the at least part of the base station almanac.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

DETAILED DESCRIPTION

Figure 1:
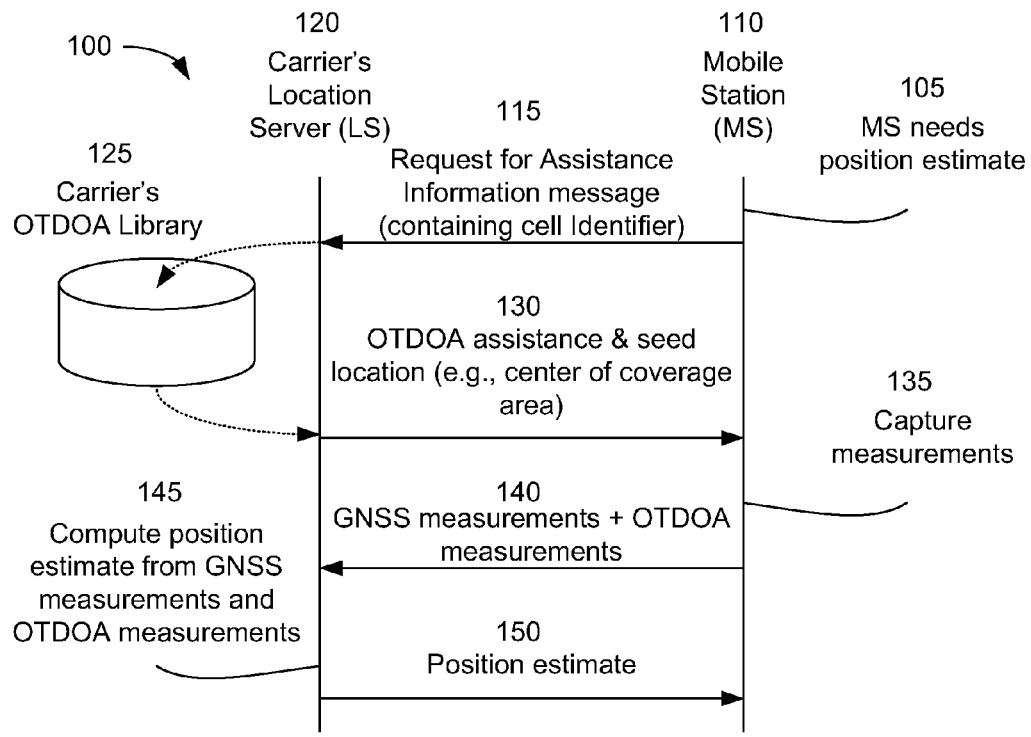
FIG. 1 shows a prior art sequence between a carrier's location server (LS) and a mobile station (MS).

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Some embodiments of the present invention provide for: (1) building a non-carrier OTDOA library with assistance from a mobile station; (2) deriving a base station almanac of base station locations from the non-carrier OTDOA library; and/or (3) supporting a non-carrier location server with assistance data requests from mobile devices using the base station almanac derived from the non-carrier OTDOA library.

Some embodiments of the present invention provide for: (1) receiving transmit time offsets ($t_{ij}$) for a plurality of base station pairs ($BS_i$, $BS_j$) in a set of base stations from a non-carrier base station almanac; (2) computing a time offset ($\Delta_{A1}$) between the mobile device at a first location ($x_1$, $y_1$) and a serving base station ($BS_A$) at a second location ($x_A$, $y_A$), wherein the set of base stations comprises the serving base station ($BS_A$); and (3) calculating time offsets ($\Delta_k$) for at least one imperceptible base station ($BS_k$) in the set of base stations, based, at least in part, on the received time offsets ($t_{ij}$) of the plurality of base station pairs ($BS_i$, $BS_j$) in the set of base stations, and the time offset ($\Delta_{A1}$) between the mobile device and the serving base station.

FIG. 1 shows a prior art sequence 100 between a carrier's location server (LS) 120 and mobile station (MS) 110. The process starts at 105, where MS 110 needs a position estimate. MS 110 may start an LTE Positioning Protocol (LPP) session by sending a Requesting for Assistance Information message 115 from the carrier's LS 120. The Requesting for Assistance Information message 115 may include a cell identifier identifying the cell where MS 110 is currently located. An LPP session may be used between the carrier's LS 120 and MS 110 to obtain location related measurements or a location estimate, or to transfer location assistance data. LPP transactions typically include a transaction ID to permit LPP requests and responses to be matched to each other.

The carrier's LS 120 may look up in a database maintained by the carrier such as carrier's OTDOA library 125, and the carrier's LS 120 may respond with an OTDOA assistance information and seed location information message 130 to MS 110 containing assistance data and a request for measurement data. The assistance data sent by carrier's LS 120 may include OTDOA assistance information and seed location information message 130. The seed location may be used by MS 110 as an initial estimate of the location of MS 110 for a position determination process. MS 110 may the capture measurements 135, which may include GNSS measurements and/or OTDOA measurements 140, which are sent to the carrier's LS 120. The carrier's LS 120 may use the GNSS measurements and OTDOA measurements received from MS 110, to compute, in step 145, a position estimate 150. The position estimate 150 is then sent to MS 110 by the carrier's LS 120.

Prior art systems are limited to obtaining OTDOA assistance data from a carrier of MS 110. That is, MS 110 is limited to communicating with its carrier, if it wants to obtain any assistance data.

Figure 2:
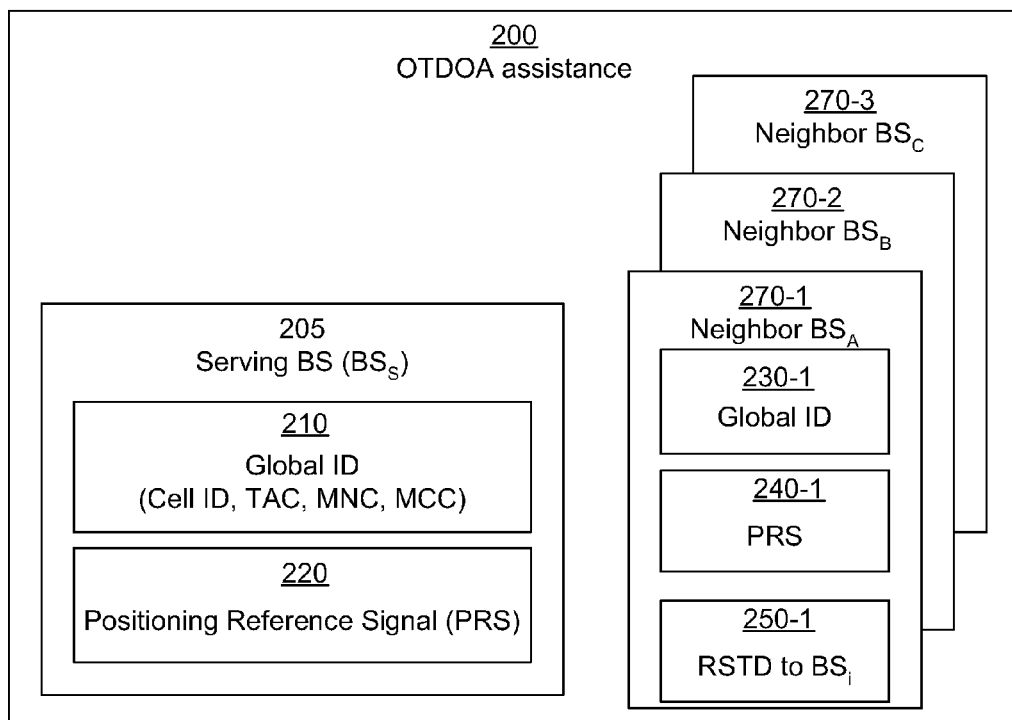
FIG. 2 shows an exemplary data structure for an OTDOA assistance data message.

FIG. 2 shows an exemplary data structure for an OTDOA assistance data message 200. The OTDOA assistance data message 200 may be sent by the carrier's LS 120 in response to a location assistance request by MS 110. OTDOA assistance data message 200 may comprise several information elements or data fields. The fields shown are exemplary only, and, in general, an OTDOA assistance data message 200 may include various other fields as specified by relevant protocols.

Information element 205, which pertains to the serving base station ($BS_S$), may include fields: (1) Global ID 210; and (2) Positioning Reference Signal information (PRS information field 220). The Global ID 210 may define the identity of the cell in a globally unique manner within the context of the public land mobile network (PLMN), where the PLMN may be identified by the Mobile Country Code (MCC) and the Mobile Network Code (MNC). The term PMLN is used to refer a network established and operated by a recognized operating agency (ROA) for the specific purpose of providing public land mobile telecommunications services. The Global ID 210 may also include a Tracking Area Code, which may uniquely identify indicate the Tracking Area to which the serving base station or e-NB belongs with a PLMN. PRS information field 220 specifies the PRS configuration of the reference cell for the OTDOA assistance data. The reference cell refers to the cell where MS 110 is located at the time of the OTDOA assistance data message 200 was sent/received. PRS information field 220 may include information such as the bandwidth that is used to configure the positioning reference signals, positioning reference signals configuration index, the number of consecutive downlink subframes with positioning reference signals, etc.

The OTDOA assistance data message 200 also includes information elements pertaining to neighbor cell information for the OTDOA assistance data. For example, the OTDOA assistance data message may include information elements 270-1, 270-2 and 270-3, which provide information pertaining to neighboring base stations shown as Neighbor $BS_A$, Neighbor $BS_B$, and Neighbor $BS_C$, respectively. Each information element may include information pertaining to a particular neighboring cell. The OTDOA neighbor cell information may be sorted in decreasing order of priority for measurement to be performed by the target device, with the first cell in the list being the highest priority for measurement.

Neighboring cell information element 270-1 for Neighbor $BS_A$ may include fields: (1) Global ID 230-1; (2) PRS information field 240-1; and (3) Reference Signal Time Difference (RSTD) 250-1. The Global ID 230-1 and PRS information field 240-1 provide global identifier information and PRS information for neighboring cell Neighbor $BS_A$ as described above. The RSTD field 250-1 specifies the relative timing difference between neighbor cell Neighbor $BS_A$ and the RSTD reference cell. Information elements 270-2 and 270-3 may contain identical fields that provide Global ID, PRS information and RSTD information for Neighbor $BS_B$, and Neighbor $BS_C$, respectively.

Figure 3:
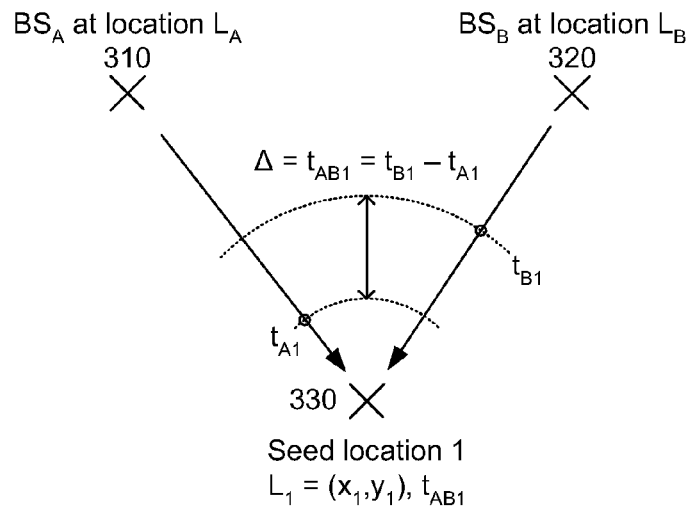
FIG. 3 illustrates an expected Observed Time Difference of Arrival (OTDOA) of signals, at a seed location, from two base stations.

FIG. 3 illustrates, at 300, an expected Observed Time Difference of Arrival (OTDOA) of signals, at seed location 330, from two neighboring base stations: neighboring base station $BS_A$ 310 and neighboring base station $BS_B$ 320.

The OTDOA message may be sent to MS 110 with seed location 330 given by $L_1=(x_1, y_1)$ and an expected time difference of arrival of positioning reference signals from neighboring base station $BS_A$ 310 at location $L_A$ and neighboring base station $BS_B$ 320 at location $L_B$. The seed location 330 is an approximation of the location of MS 110. The seed location 330 may not accurately reflect the actual position of MS 110, but serves as a location for calculation of OTDOA time differences. Often, the seed location 330 is based on the cell or cell coverage area (e.g., at the center of the cell coverage area), and is independent of where MS 110 is positioned within the cell.

OTDOA assistance information and seed location information message 130 may include seed location 330 and the time differences of arrival $t_{AB1}$ at seed location 330 from base station pair: (1) neighboring base station $BS_A$ 310; and neighboring base station $BS_B$ 320. The message, however, does not include the location of neighboring base station $BS_A$ 310 and neighboring base station $BS_B$ 320.

MS 110 may then use reference signal time difference (RSTD) measurements conducted on the positioning reference signals received from the base station pair (neighboring base station $BS_A$ 310 and neighboring base station $BS_B$ 320) to obtain an OTDOA value for the base station pair $BS_A$.

As shown in FIG. 3, each OTDOA measurement for a pair of base station transmissions, such as transmissions from base station pair (neighboring base station $BS_A$ 310 and neighboring base station $BS_B$ 320), describes a line of constant difference along which MS 110 may be located. This may be described by Eq. 1 below:

$$\Delta = t_{AB1} = t_{B1} - t_{A1} \quad \text{(Eq. 1)}$$

where $t_{A1}$ and $t_{B1}$ are the observed times of arrival of the PRS information signal from neighboring base station $BS_A$ 310 and neighboring base station $BS_B$ 320, respectively, at MS 110 and $t_{AB1}$ is the observed time difference of arrival between the two signals.

By taking OTDOA measurements for at least two pairs of base stations, the location of MS 110 may be determined. Typically, to facilitate greater precision in measurements, base stations in a network may be time synchronized.

Figure 4:
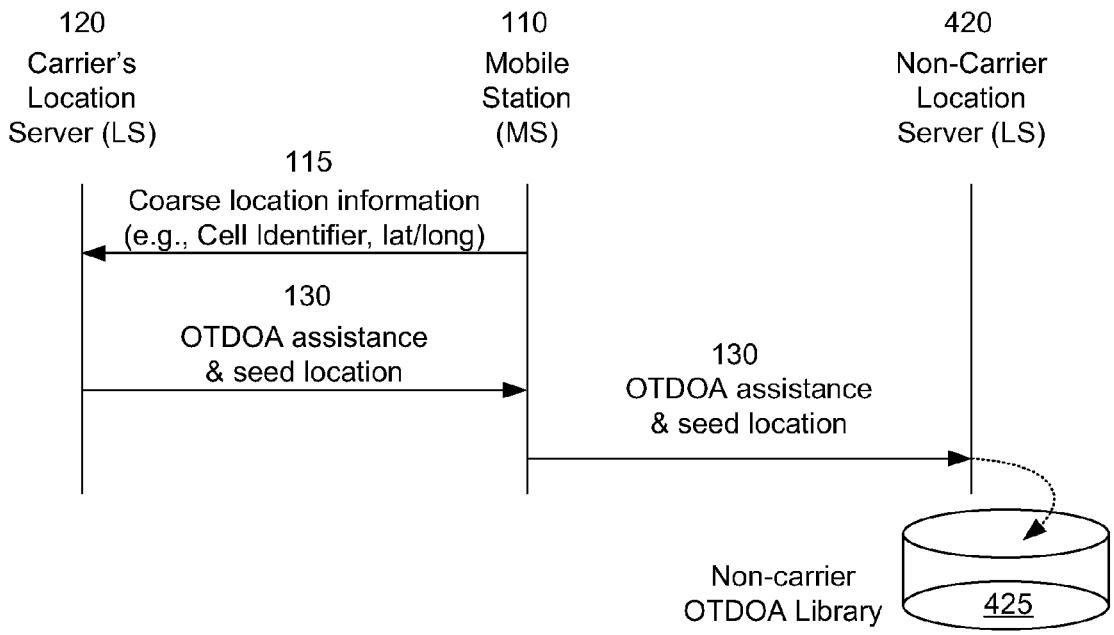
FIG. 4 shows a thread diagram of OTDOA communications with an exemplary mobile station (MS) and communication between the MS and a non-carrier OTDOA library consistent with disclosed embodiments.

FIG. 4 shows a thread diagram 400 of OTDOA communications with exemplary mobile station 110 and communication between MS 110 and a non-carrier OTDOA library consistent with disclosed embodiments.

The figure shows how a mobile device, represented as MS 110, assists a non-carrier location server to build an OTDOA library. In some embodiments, a mobile device such as exemplary mobile station (e.g., MS 110) may start an LTE Positioning Protocol (LPP) session by sending the Requesting for Assistance Information message 115 from the carrier's LS 120. The Requesting for Assistance Information message 115 may include a cell identifier identifying the cell where MS 110 is currently located or information such as an estimate of latitude longitude of MS 110's current location, which may be obtained using GPS or SPS services.

The carrier's LS 120 may respond with an OTDOA assistance information and seed location information message 130 to the MS 110 containing assistance data and a request for measurement data. The assistance data sent by carrier's LS 120 may include OTDOA assistance information and seed location information message 130. In some embodiments, MS 110 may forward the OTDOA assistance information and seed location information message 130 to a non-carrier location server 420, which may store the information in non-carrier OTDOA library 425.

In some embodiments, MS 110 may send a single set of coarse location information representing its current location to the carrier's LS and in response may receive the OTDOA assistance data and seed location. In some embodiments, MS 110 may send one or more sets of coarse location information to the carrier's LS 120, wherein the coarse locations sent to the carrier's LS 120 by MS 110 are not coarse locations of MS 110. Instead, in some embodiments, the coarse locations sent to the carrier's LS 120 by MS 110 may be cell identifiers of some other locations unrelated to the current coarse location of MS 110.

Figure 5:
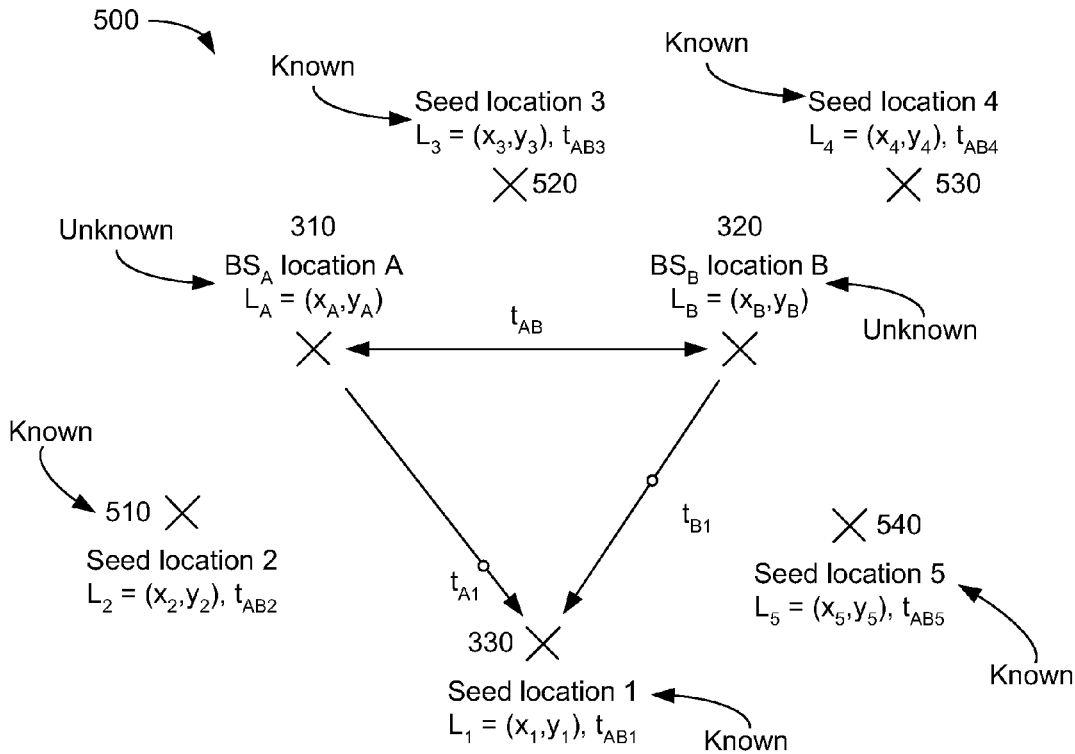
FIG. 5 shows how the locations of base station pair (neighboring base station $BS_A$ and neighboring base station $BS_B$), whose coordinates are unknown, may be calculated using information pertaining to five known seed locations and their respective expected OTDOA values, in a manner consistent with disclosed embodiments.

FIG. 5 shows, at 500, how the locations of base station pair (neighboring base station $BS_A$ 310 and neighboring base station $BS_B$ 320), whose coordinates are unknown, may be calculated using information pertaining to five known seed locations and their respective expected OTDOA values, in a manner consistent with disclosed embodiments.

In some embodiments, the non-carrier OTDOA library 425 may be updated with several seed locations, corresponding base station pairs and expected OTDOA information for each seed location in the non-carrier OTDOA library 425.

FIG. 5 shows five seed locations for base station pair (neighboring base station $BS_A$ at location $(x_A, y_A)$ and neighboring base station $BS_B$ 320 at location $(x_B, y_B)$). In some embodiments, information pertaining to seed location 1 ($L_1=(x_1, y_1)$ 330), seed location 2 ($L_2=(x_2, y_2)$ 510), seed location 3 ($L_3=(x_3, y_3)$ 520), seed location 4 ($L_4=(x_4, y_4)$ 530) and seed location 5 ($L_5=(x_5, y_5)$ 540), and the expected time difference of arrival of signals for each of the five different seed locations $t_{AB1}$, $t_{AB2}$, $t_{AB3}$, $t_{AB4}$, and $t_{AB5}$ for locations $L_1$ 330, $L_2$ 510, $L_3$ 520, $L_4$ 530, and $L_5$ 540, respectively, may be determined at MS 110 from a non-carrier OTDOA library 425, where, $t_{ABi} = t_{Ai} - t_{Bi}$, for $1 \leq i \leq 5$ and where $t_{A1}$ and $t_{B1}$ are the observed times of arrival of the PRS information signal from neighboring base station $BS_A$ and neighboring base station $BS_B$, respectively, and where $t_{AB1}$ is the observed time difference of arrival between the two signals.

The unknown variables include physical locations $L_A$ and $L_B$ of base station pair (neighboring base station $BS_A$ and neighboring base station $BS_B$) and a time difference of signal transmission $t_{AB}$ between the pair of base stations.

The physical locations of the pair of base stations and a time difference of signal transmission between the pair of base stations may be computed from the known variables by solving a system of equations. For OTDOA assistance data containing more than five seed locations for one base station pair, well-known statistical methods such as least mean square (LMS) may be used. LMS is used to find solutions in overdetermined systems, i.e., sets of equations where the number of equations exceeds the number of unknowns. The LMS algorithm may be used to minimize the error that occurs, for example, between the actual positions of base stations (e.g., neighboring base station $BS_A$ and neighboring base station $BS_B$) and their estimated positions.

Figure 6:
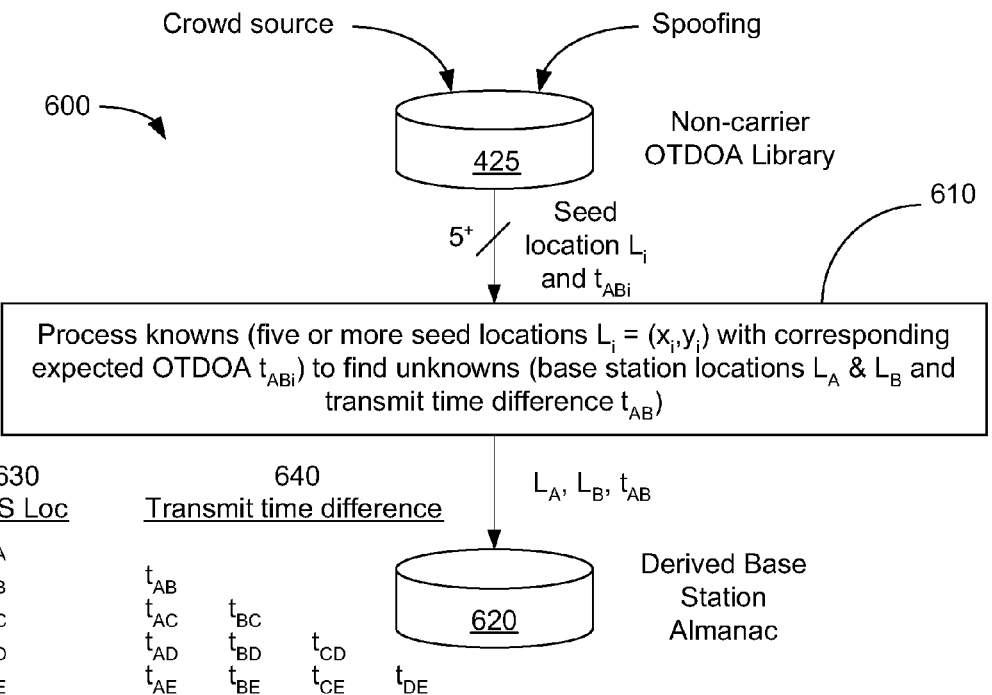
FIG. 6 shows a process of collecting and converting OTDOA information into a base station almanac in a manner consistent with embodiments disclosed herein.

FIG. 6 shows a process 600 of collecting and converting OTDOA information into a base station almanac in a manner consistent with embodiments disclosed herein. In some embodiments, the non-carrier OTDOA library 425 may be built by using information pertaining to seed locations for base station pairs corresponding expected OTDOA times. Further, in some embodiments, the non-carrier OTDOA library 425 may be built using mobile devices (such as MS 110) querying the carrier's LS 120 using various coarse locations, wherein the coarse locations may not reflect the actual or known coarse location of MS 110. In some embodiments, the non-carrier OTDOA library 425 may be built by crowd sourcing, where OTDOA library related information is collected by a number of users (the "crowd") at a variety of locations in the normal course of obtaining location services from their contracted carrier. In one embodiment, users may install an application on the mobile device that sends OTDOA library related information that is obtained from a carrier during the normal course obtaining location services to a non-carrier server, which may then the update non-carrier OTDOA library 425 with this information. Using information reported by a large number of users may facilitate quick and accurate updates to the non-carrier OTDOA library 425.

In step 610, information from the non-carrier OTDA library 425 may be used by processing a number of known variables, such as seed locations and the corresponding expected OTDOA times, to determine the locations of the base station pairs. For example, using previously determined five or more seed locations $L_i$ and corresponding expected OTDOA times $t_{ABi}$ for an exemplary station pair (neighboring base station $BS_A$ and neighboring base station $BS_B$), the locations $L_A=(x_A, y_A)$, $L_B=(x_B, y_B)$ and time difference of signal transmission $t_{AB}$ between the pair of base stations (neighboring base station $BS_A$ and neighboring base station $BS_B$) may be determined.

Information pertaining to the locations $L_i$ of base stations and the transmit time difference $t_{ij}$ between base station at location $L_i$ and a base station at location $L_j$ may be used to create and/or update the derived base station almanac 620. In some embodiments, a derived base station almanac may comprise information pertaining to the location of a base station and the transmit time difference between that base station and zero or more neighboring base stations.

For example, FIG. 6 shows exemplary entries in the derived base station almanac 620, which include, base station location 630 and transmit time difference 640 for that base station relative to one or more other base stations. For example, the entry for a base station $BS_D$ whose location is given by $L_D$ shows transmit time differences of $t_{AD}$, $t_{BD}$, and $t_{CD}$, relative to base stations $BS_A$, $BS_B$, and $BS_C$, respectively.

Figure 7:
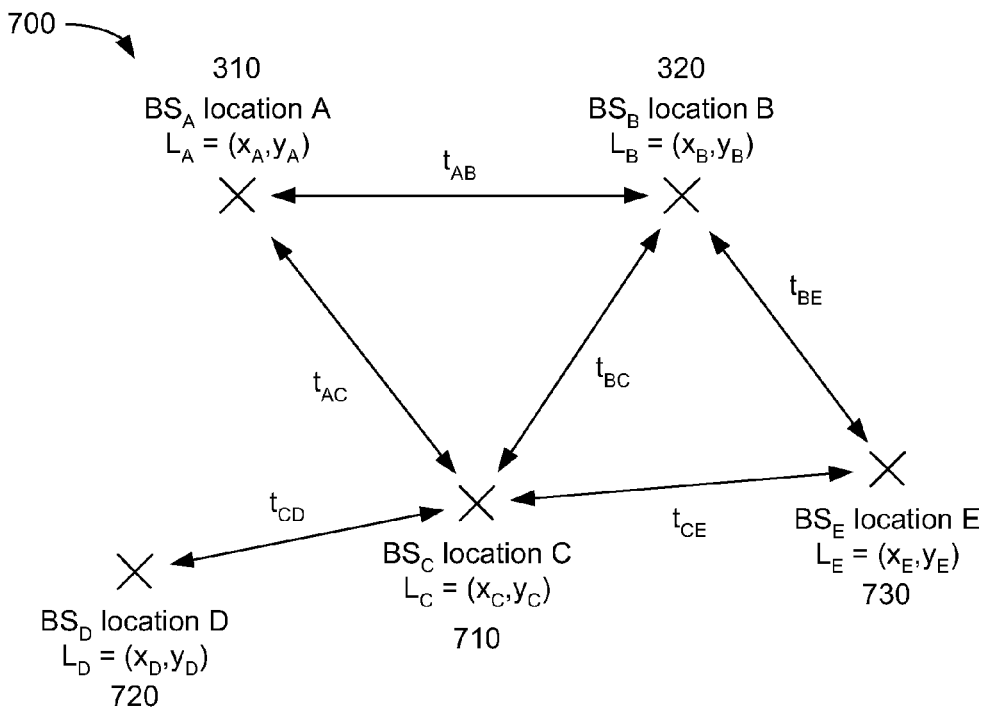
FIG. 7 shows a plot of a network of neighboring base stations and relative time offsets, in accordance with some embodiments of the present invention.

FIG. 7 shows a plot 700 of a network of neighboring base stations and relative time offsets. A portion of the information in the derived base station almanac 620 is shown graphically and shows neighboring base stations $BS_A$ 310, $BS_B$ 320, $BS_C$ 710, $BS_D$ 720 and $BS_E$ 730 with base station locations 630 given by $L_A=(x_A, y_A)$, $L_B=(x_B, y_B)$, $L_C=(x_C, y_C)$, $L_D=(x_D, y_D)$ and $L_E=(x_E, y_E)$, respectively. Transmit time difference 640 between a pair of neighboring base stations is indicated by the double arrows between the base stations and are shown as $t_{AB}$, $t_{AC}$, $t_{BC}$, $t_{BE}$, $t_{CE}$, and $t_{CD}$. In some embodiments, the base stations may also be mapped to a physical location along with a time reference that represents a transmission time difference from a system or reference clock, such as a time difference from GPS time.

Figure 8:
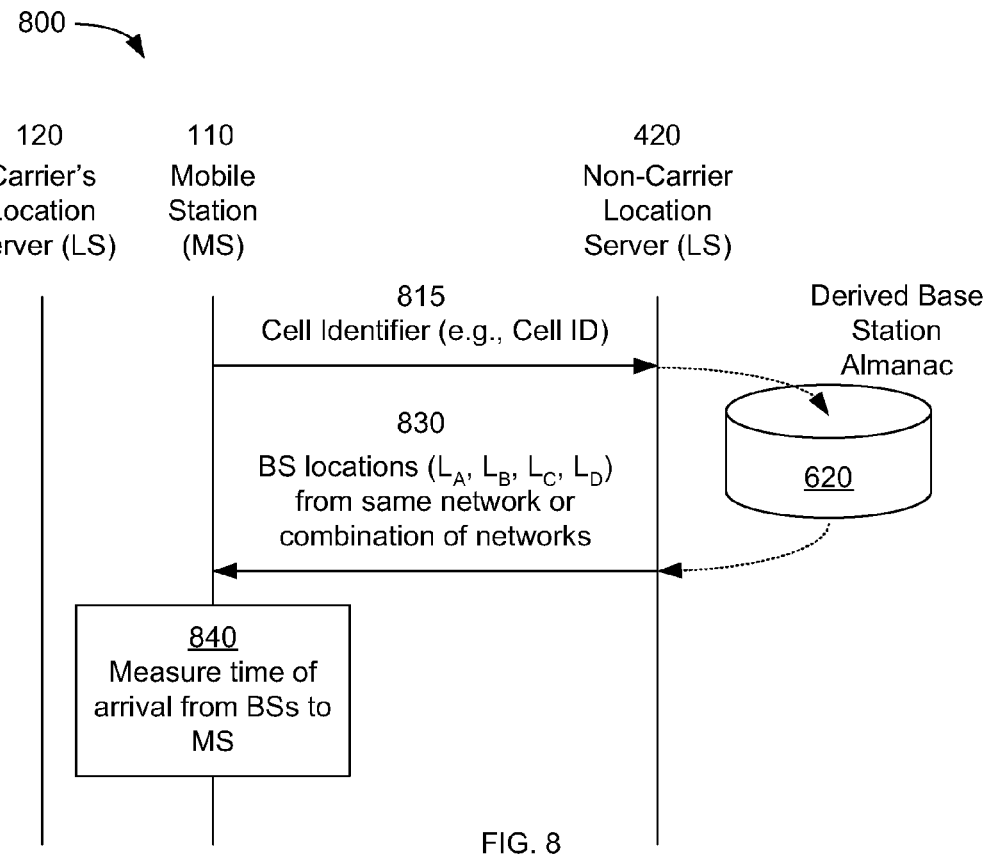
FIG. 8 shows an exemplary thread diagram of OTDOA communications with a mobile device to obtain location information using a derived base station almanac, in a manner consistent with disclosed embodiments.

FIG. 8 shows an exemplary thread diagram 800 of OTDOA communications with MS 110 to obtain location information using a derived base station almanac 620, in a manner consistent with disclosed embodiments. In some embodiments, the OTDOA communications to obtain location information for MS 110 do not involve or use the carrier's LS 120 and may instead use non-carrier location server 420 and the derived base station almanac 620.

In some embodiments, once the derived base station almanac 620 is operational, (for example, after a non-carrier location server has converted non-carrier OTDOA library 425 to the derived base station almanac 620), MS 110 may directly communicate with a non-carrier location server to obtain: (i) OTDOA assistance data from the non-carrier OTDOA library 425 and/or (ii) physical base station locations from the derived base station almanac 620 thereby bypassing the carrier's LS 120. In some embodiments, the physical base station locations from the derive base station almanac may include a combination of base station locations, including base station locations from the network serving MS 110 as well as base station locations for one or more alternate networks not configured to server MS 110. In some embodiments, MS 110 may send coarse location information 815, which may include a cell identifier to a non-carrier location server, which may access the derived base station almanac 620 and respond with message 830 including the locations of neighboring base stations $BS_A$ 310, $BS_B$ 320, $BS_C$ 710, $BS_D$ 720 and $BS_E$ 730 with base station locations 630 given by $L_A=(x_A, y_A)$, $L_B=(x_B, y_B)$, $L_C=(x_C, y_C)$, $L_D=(x_D, y_D)$ and $L_E=(x_E, y_E)$, respectively. In some embodiments, MS 110 may then use the provided information to make time of arrival measurements 840, and the measured information may be used to determine its location without resorting to carrier based location services.

Figure 9:
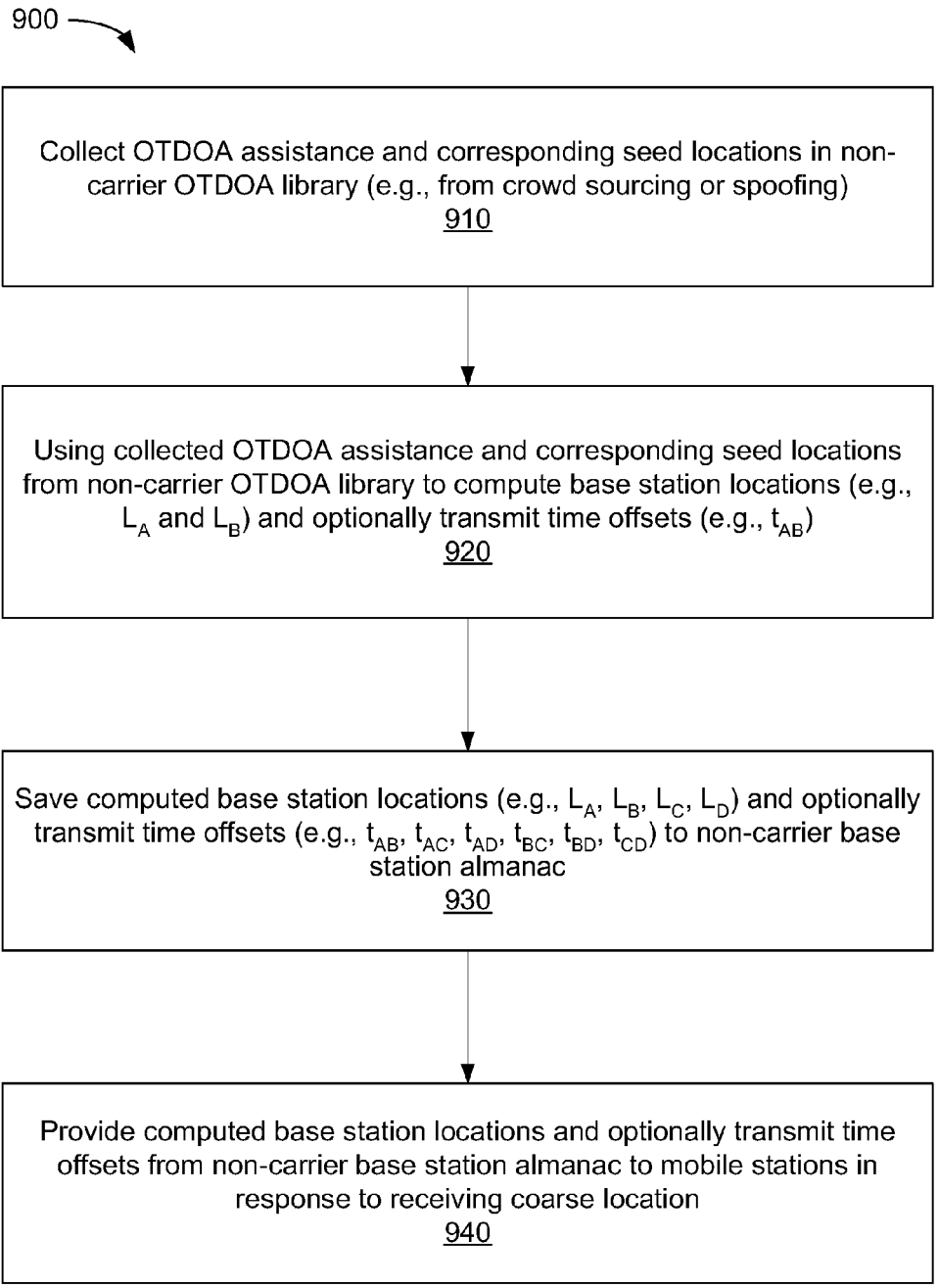
FIG. 9 shows a flowchart of an exemplary method of creating and using a base station almanac from OTDOA information, in a manner consistent with disclosed embodiments.

FIG. 9 shows a flowchart of an exemplary method 900 of creating and using a base station almanac from OTDOA information, in a manner consistent with disclosed embodiments. In step 910, seed locations and OTDOA assistance data corresponding to the seed locations may be collected and stored in a non-carrier OTDOA library, such as exemplary non-carrier OTDOA library 425. For example, OTDOA assistance data $t_{AB}$; for seed locations $L_i$ for $1 \leq i \leq 5$ may be collected by using crowd sourcing, by using MS 110 to report a variety of incorrect coarse locations, and/or other techniques.

Next, in step 920, the collected seed locations and OTDOA assistance information corresponding to the seed locations from a non-carrier OTDOA library 425 may be used to compute base station locations. For example, locations $L_A=(x_A, y_A)$, $L_B=(x_B, y_B)$ and optionally transmit time offset $t_{AB}$ for base station pair $BS_A$ and $BS_B$ may be computed using information in the non-carrier OTDOA library 425.

In step 930, the computed base station locations $L_i$ and transmit time offsets $t_{ij}$ for a pair of neighboring base stations $BS_i$ and $BS_j$ may be stored and/or used to update a non-carrier derived base station almanac, such as exemplary derived base station almanac 620. For example, the locations of neighboring base stations $BS_A$ 310, $BS_B$ 320, $BS_C$ 710, $BS_D$ 720 and $BS_E$ 730 with base station locations 630 given by $L_A=(x_A, y_A)$, $L_B=(x_B, y_B)$, $L_C=(x_C, y_C)$, $L_D=(x_D, y_D)$ and $L_E=(x_E, y_E)$, respectively, may be stored and/or updated in the derived base station almanac 620. Further, in some embodiments, the transmit time difference 640 between pairs of neighboring base stations, for example, $t_{AB}$, $t_{AC}$, $t_{BC}$, $t_{BE}$, $t_{CE}$, and $t_{CD}$ may be stored and/or updated in the derived base station almanac 620.

In step 940, in some embodiments, the computed base station locations and optionally, the transmit time offsets from a non-carrier base station almanac may be provided to mobile stations in response to receiving the coarse location. In some embodiments, exemplary method 900 may be performed by MS 110 or an application running on MS 110 and other non-carrier based applications, such as an application running on a non-carrier location server 420.

Figure 10:
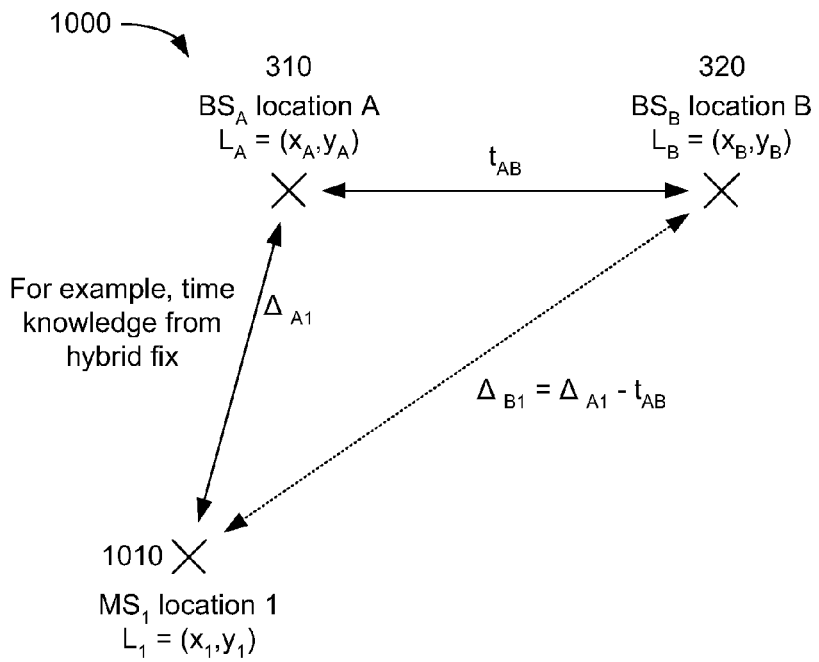
FIGS. 10 and 11 plot locations of a mobile device relative to a network of base stations, in accordance with some embodiments of the present invention.
Figure 11:
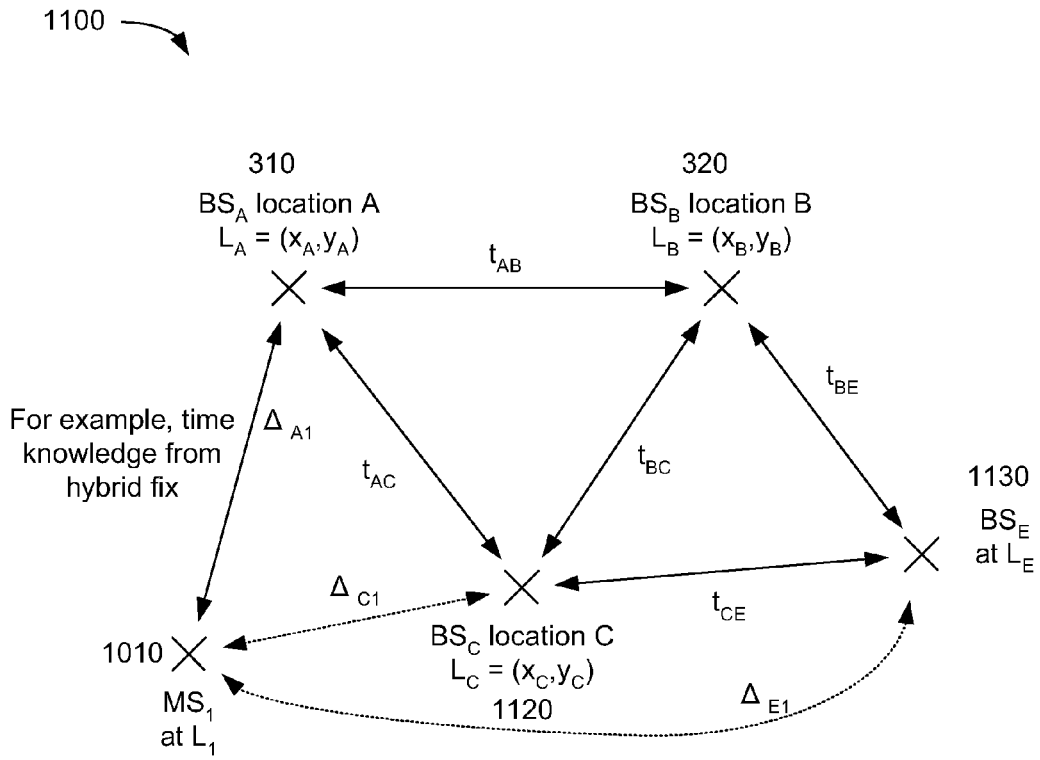

FIGS. 10 and 11 plot locations of a mobile device relative to a network of base stations, in accordance with some embodiments of the present invention. In FIG. 10, a graphical illustration 1000 shows locations of a mobile device relative to a network of base stations showing limited communication with one of the base stations in the network. In one example, MS 110 at location $L_1$ 1010, has two-way communication with first neighboring base station $BS_A$ at location $L_A=(x_A, y_A)$, but not with a second neighboring base station $BS_B$ 320 at location $L_B=(x_B, y_B)$. The second neighboring base station $BS_B$ 320 may be imperceptible to MS 110, in that communications with the second neighboring base station $BS_B$ 320 may be limited or non-existent. For example, the second neighboring base station $BS_B$ 320 may be remote from MS 110 or may be occluded from MS 110 so that signals from second base station $BS_B$ 320 may not be reliably detected and/or used by MS 110.

In some instances, MS 110 may be able to receive information from second base station $BS_B$ 320 but may not be able to conduct two-way communication with $BS_B$ 320, as indicated by the dotted double arrow between MS 110 and the second base station $BS_B$ 320 in FIG. 10. In some embodiments, despite the lack of two-way communication with the second base station $BS_B$ 320, MS 110 may be able to compute a transmission time difference $\Delta_{B1}$ between the second base station $BS_B$ at location B and the mobile device at location 1.

MS 110 may retrieve the transmission time difference $t_{AB}$ between first neighboring base station $BS_A$ 310 and second neighboring base station $BS_B$ 320 from the derived base station almanac 620. Further, in some embodiments, MS 110 may compute a transmission time difference $\Delta_{A1}$ between the mobile device ($MS_1$) at location $L_1$ and the first neighboring base station $BS_A$ 310. With the transmission time difference $\Delta_{A1}$ and the transmission time difference ($t_{AB}$), the mobile device may compute a transmission time difference $\Delta_{B1}$ between the second neighboring base station $BS_B$ 320 at location $L_B$ and the mobile device at location 1.

In some embodiments, an estimate of location L1 may be obtained using a hybrid position fix, where MS 110 may employ a Global Positioning System (GPS) receiver and the coordinates of location $L_1$ may be computed based on GPS measurements. In some embodiments, MS 110 may measure other network events such as, but not limited to, round trip time (RTT) to neighboring base station $BS_A$ 310, and arrival time of a reference signal from neighboring base station $BS_A$ 310 that facilitate computation of transmission time difference $\Delta_{A1}$.

Accordingly, in some embodiments, by using one or more methods described above, MS 110 may obtain transmission time differences to neighboring base stations with two-way communication and may also obtain transmission time differences for distant base stations where it may not be able to receive a clear signal.

In FIG. 11, a graphical illustration 1100 shows locations of a mobile device relative to a network of base stations having limited communication with one or more of the base stations in the network. The exemplary mobile device, such as MS 110 at location $L_1$ 1010, has two-way communication with first neighboring base station $BS_A$ 310 at location $L_A=(x_A, y_A)$ and second neighboring base station $BS_B$ at location $L_B=(x_B, y_B)$, but not with base stations $BS_C$ 1120 at location $L_C=(x_C, y_C)$ and $BS_E$ 1130 at location $L_E=(x_E, y_E)$.

In some embodiments, MS 110 may retrieve the transmission time differences $t_{AB}$, $t_{AC}$, $t_{BC}$, and $t_{BE}$, between pairs of neighboring base stations, for example, between: (1) neighboring base station $BS_A$ 310 and neighboring base station $BS_B$ 320; (2) neighboring base station $BS_A$ 310 and neighboring base station $BS_C$ 1120; (3) neighboring base station $BS_B$ 320 and neighboring base station $BS_C$ 1120; and (4) neighboring base station $BS_B$ 320 and neighboring base station $BS_E$ 1130, from the derived base station almanac 620.

As discussed with respect to FIG. 11, in some embodiments, $\Delta_{C1}$ may be computed using $t_{AC}$ and by computing $\Delta_{A1}$. Similarly, $\Delta_{B1}$ may be computed if $t_{AE}$ is known. In some embodiments, $t_{AE}$ may be approximated as $t_{AE}=t_{AC}+t_{CE}$, or $t_{AE}$ may be directly obtained from the derived base station almanac 620, if available. Given $\Delta_{A1}$ and $t_{AE}$, $\Delta_{B1}$ may be computed as described earlier.

In some embodiments, MS 110 may compute transmission time differences $\Delta_{C1}$ relative to a distant base station $BS_C$ 1120 at location $L_C$ and $\Delta_{B1}$ relative to a distant base station $BS_E$ 1130 at location $L_E$ using the parameters above. Various well-known methods, including those described above, may be used to compute an average transmission time difference when multiple paths exist between the mobile device and the distant base station.

Figure 12:
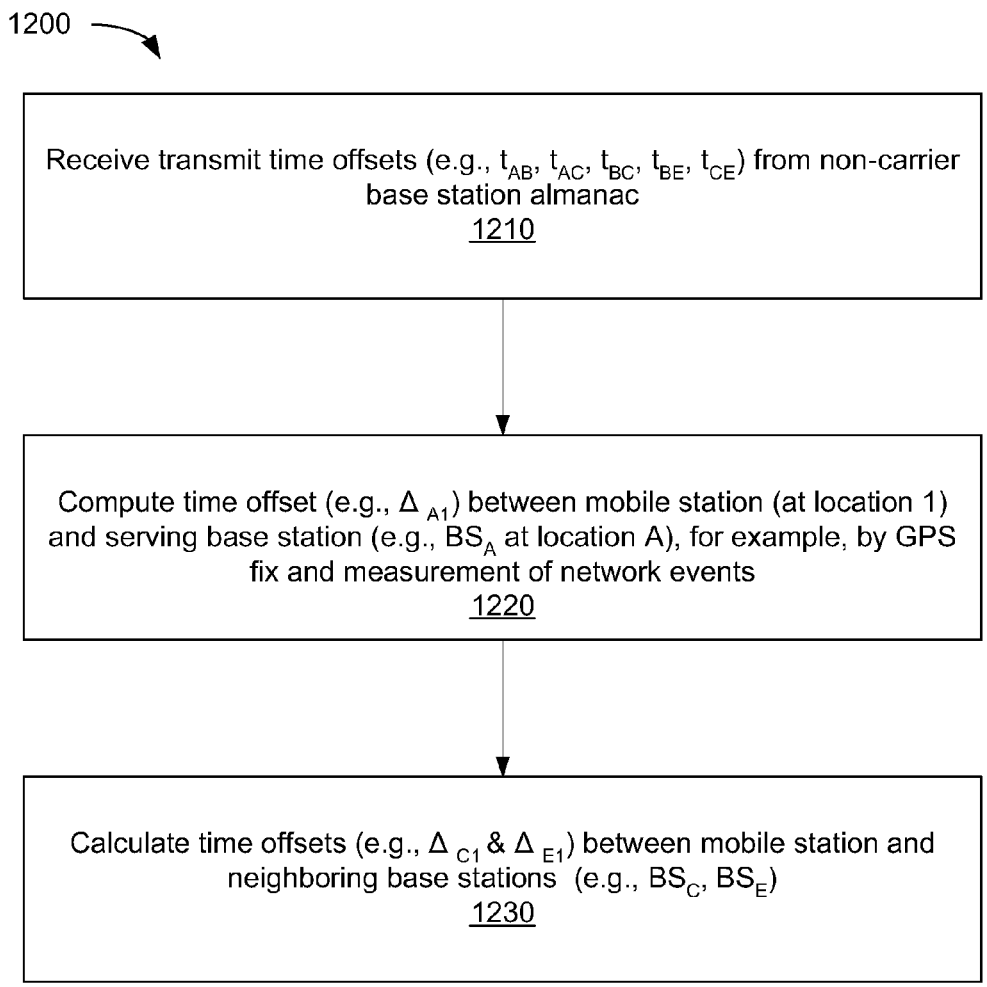
FIG. 12 shows a flowchart illustrating an exemplary method of determining an absolute time difference using OTDOA information between a mobile device and reachable and unreachable base stations, in a manner consistent with disclosed embodiments.

FIG. 12 shows a flowchart illustrating an exemplary method 1200 of determining an absolute time difference using OTDOA information between a mobile device and reachable and unreachable base stations, in a manner consistent with disclosed embodiments. In step 1210, transmit time offsets may be received by MS 110 from a non-carrier base station almanac, such as exemplary non-carrier the derived base station almanac 620. For example, transmit time differences for neighboring base station pairs $t_{AB}$, $t_{AC}$, $t_{BC}$, $t_{BE}$, $t_{CE}$ etc. may be received by MS 110 from a non-carrier the derived base station almanac 620.

Next, in step 1220, a time offset may be computed between MS 110 at location $L_1$ and the serving base station, such as exemplary base station $BS_A$ at location $L_A$. For example, time offset $\Delta_{A1}$ between MS 110 at location $L_1$ and serving base $BS_A$ at location $L_A$ may be computed using various techniques, for example, by obtaining a GPS fix and measurement of network events.

In step 1230, unknown time offsets may be calculated from known information using various well known methods. For example, when multiple paths are available, the unknown time offsets may be calculated. For example, as shown in FIG. 11, time offsets $\Delta_{C1}$ and $\Delta_{E1}$ between MS 110 and neighboring cells $BS_C$ and $BS_E$ may be calculated if other system parameters are known, or can be determined or approximated. In some embodiments, the graphical illustration 1100 of the system may be modeled as a Bayesian net and the values of unknown parameters may be determined using well-known techniques.

Figure 13:
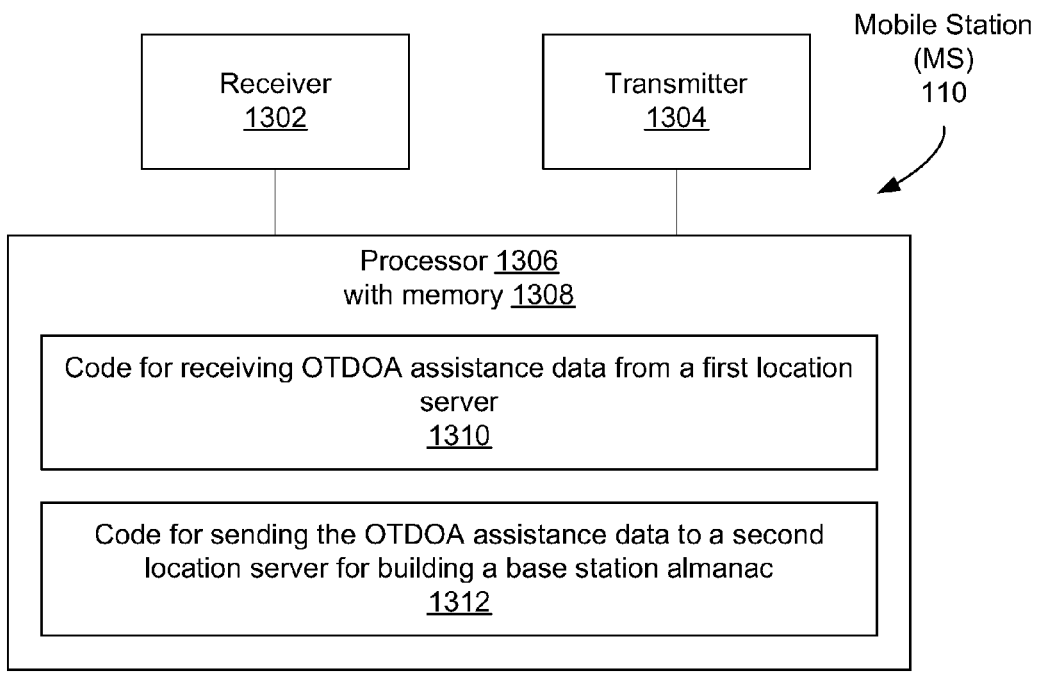
FIGS. 13, 14 and 15 illustrate a mobile station, in a manner consistent with disclosed embodiments.
Figure 14:
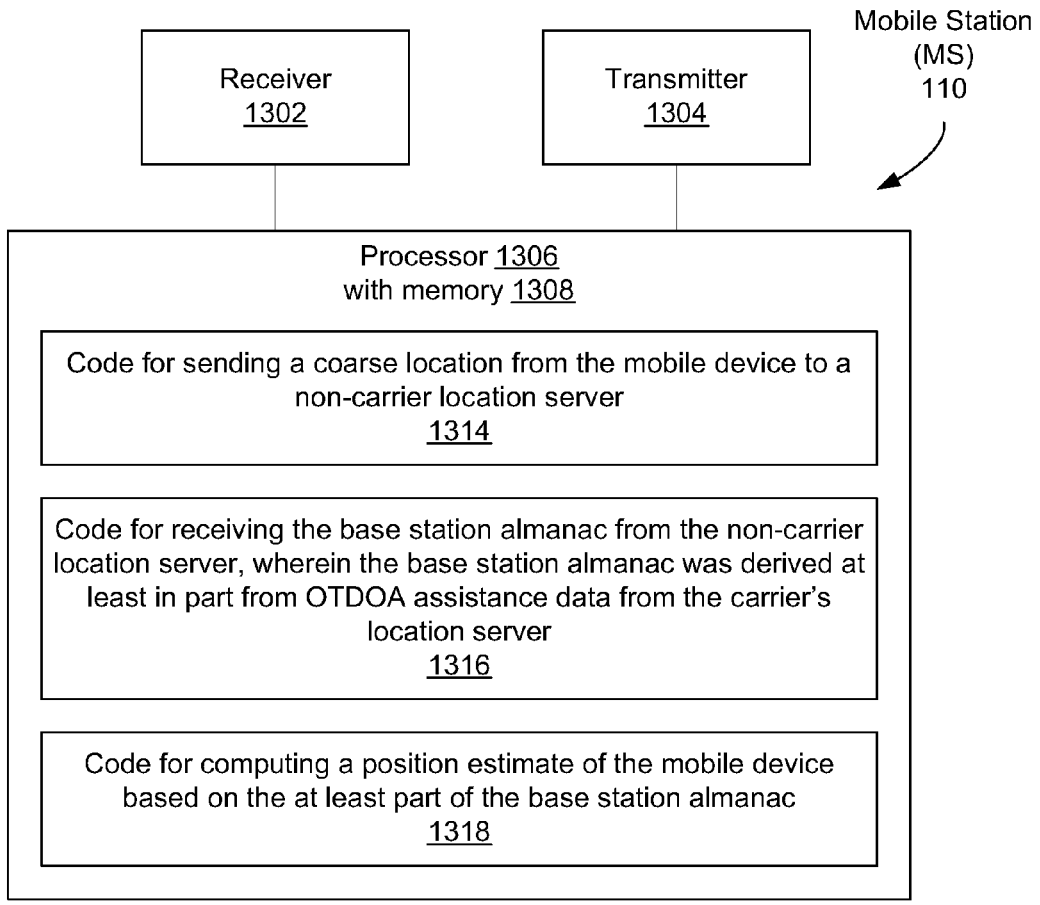
Figure 15:
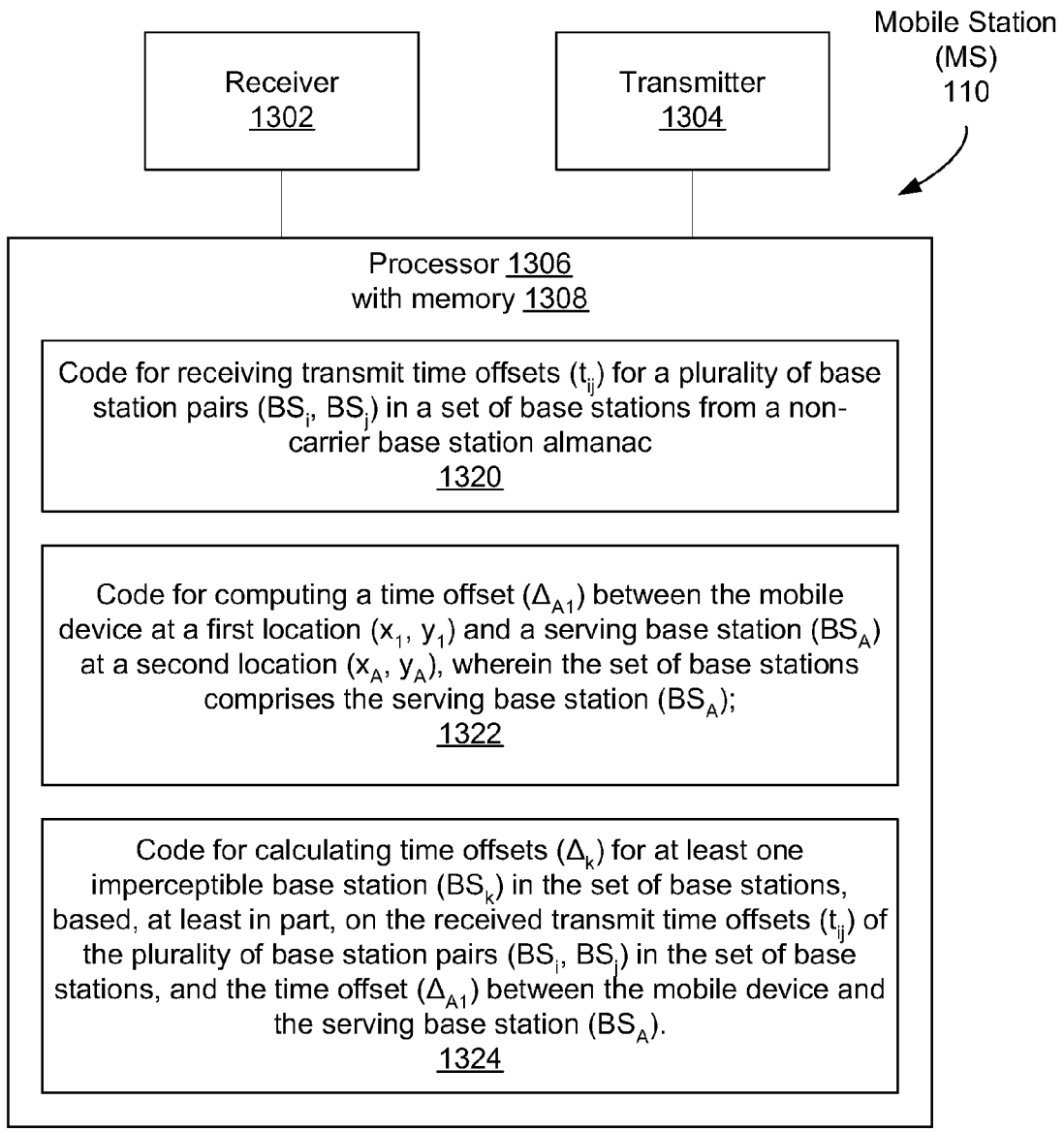

FIGS. 13, 14 and 15 illustrate a mobile station, in a manner consistent with disclosed embodiments. In FIG. 13, a mobile device or mobile station 110 for facilitating building of a base station almanac is shown. The mobile station 110 comprising a receiver 1302, a transmitter 1304, and a processor 1306 with a memory 1308 coupled to the receiver 1302.

The receiver 1302 and transmitter 1304 may be implemented as a transceiver and may receive and transmit signals in various networks including WWAN, WLAN or WPAN networks operating in CDMA, TDMA, FDMA, OFDMA, SC-FDMA or LTE system, or combinations thereof.

The processor 1306 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The memory 1308 may comprise on-board memory, separate local memory or remote memory. The memory 1308 comprises code to be executed by the processor 1306 for: (1) receiving, at the mobile station 110, observed time difference of arrival (OTDOA) assistance data from a first location server; and (2) sending, from the mobile station 110, the OTDOA assistance data to a second location server for building the base station almanac.

In FIG. 14, a mobile device or mobile station 110 includes a receiver 1302, a transmitter 1304 and a processor 1306 with a memory 1308 coupled to the receiver 1302 and transmitter 1304. The receiver 1302, transmitter 1304, processor 1306 and memory 1308 are described in further detail above with reference to FIG. 13. The memory 1308 includes code to be executed by the processor 1306 for sending a coarse location from the mobile station 110 to a non-carrier location server 420. The non-carrier location server 420 is distinct from a network providing service to the mobile station 110 and distinct from a carrier's location server 120 that offers service to the mobile station 110. The non-carrier location server 420 includes a non-carrier observed time difference of arrival (OTDOA) library 1520 and a base station almanac. The memory 1308 also includes code to be executed by the processor 1306 for receiving, at the mobile station 110, at least part of the base station almanac from the non-carrier location server 420. The base station almanac is derived at least in part from OTDOA assistance data from the carrier's location server 120. The memory 1308 also includes code to be executed by the processor 1306 for computing a position estimate of the mobile station 110 based on the at least part of the base station almanac.

In FIG. 15, a mobile station 110 is shown including includes a receiver 1302, a transmitter 1304 and a processor 1306 with a memory 1308 coupled to the receiver 1302 and transmitter 1304. The receiver 1302, transmitter 1304, processor 1306 and memory 1308 are described in further detail above with reference to FIG. 13. The memory 1308 includes code to be executed by the processor 1306 for: (1) receiving transmit time offsets ($t_{ij}$) for a plurality of base station pairs ($BS_i$, $BS_j$) in a set of base stations from a non-carrier base station almanac; (2) computing a time offset ($\Delta_{A1}$) between the mobile station 110 at a first location ($x_1$, $y_1$) and a serving base station ($BS_A$) at a second location ($x_A$, $y_A$), wherein the set of base stations comprises the serving base station ($BS_A$); and (2) calculating time offsets ($\Delta_k$) for at least one imperceptible base station ($BS_k$) in the set of base stations, based, at least in part, on the received transmit time offsets ($t_{ij}$) of the plurality of base station pairs ($BS_i$, $BS_j$) in the set of base stations, and the time offset ($\Delta_{A1}$) between the mobile device and the serving base station ($BS_A$).

Figure 16:
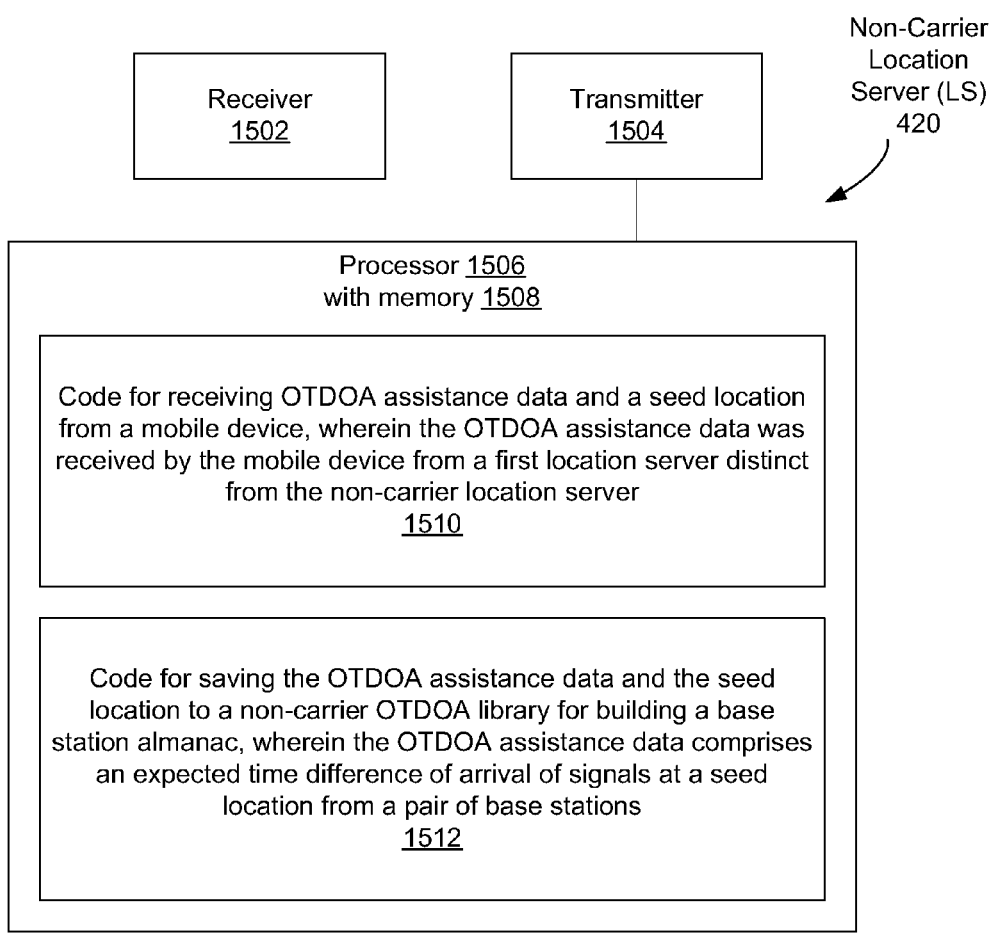
FIGS. 16 and 17 illustrate a non-carrier location server, in a manner consistent with disclosed embodiments.
Figure 17:
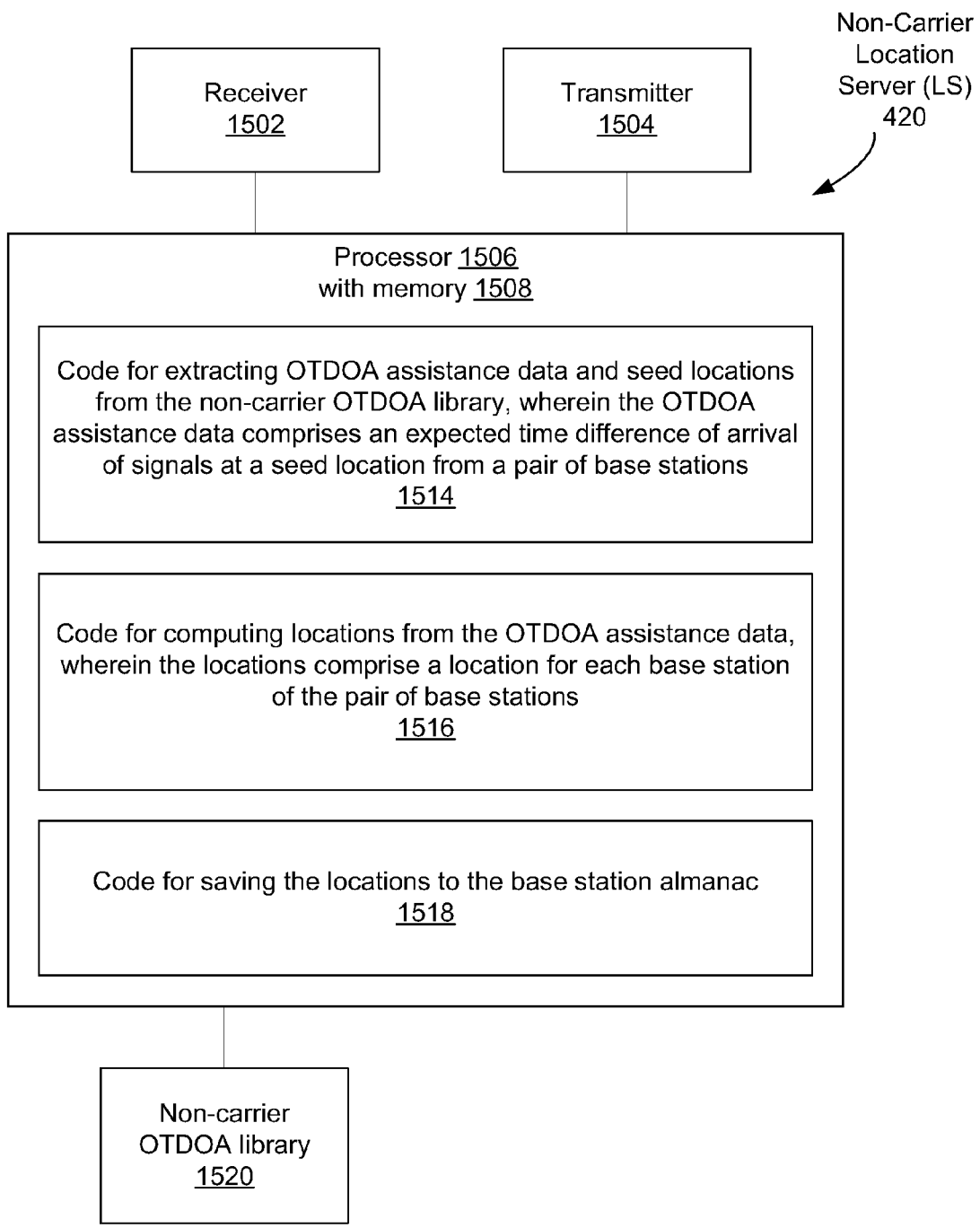

FIGS. 16 and 17 illustrate a non-carrier location server, in a manner consistent with disclosed embodiments. In FIG. 16, a non-carrier location server 420 is shown including a receiver 1502, a transmitter 1504, a processor 1506 coupled to the receiver 1502 and transmitter 1504, and a memory 1508.

The receiver 1502, transmitter 1504, processor 1506 and memory 1508 are similar to the receiver 1302, transmitter 1304, processor 1306 and memory 1308 described above with reference to FIG. 13. The receiver 1502 and transmitter 1504 may be implemented as a transceiver and may receive and transmit signals in various networks including WWAN, WLAN or WPAN networks operating in CDMA, TDMA, FDMA, OFDMA, SC-FDMA or LTE system, or combinations thereof.

The processor 1506 may be implemented within one or more ASICs, DSPs, DSPDs, PLDs, FPGAs, processors, controllers, micro-controllers, microprocessors, electronic devices, other electronic units designed to perform the functions described herein, or a combination thereof.

The memory 1508 may comprise on-board memory, separate local memory or remote memory. The memory 1508 comprises code to be executed by the processor 1506 for: (1) receiving, at the non-carrier location server 420, observed time difference of arrival (OTDOA) assistance data and a seed location from a mobile station 110, wherein the OTDOA assistance data was received by the mobile station 110 from a first location server distinct from the non-carrier location server 420; and (2) saving, at the non-carrier location server, the OTDOA assistance data and the seed location to a non-carrier OTDOA library for building a base station almanac. The OTDOA assistance data comprises an expected time difference of arrival of signals at a seed location from a pair of base stations.

In FIG. 17, a non-carrier location server 420 for building a base station almanac is shown. The non-carrier location server 420 includes a receiver 1502, a transmitter 1504, a processor 1506 coupled to the receiver 1502 and transmitter 1504 and a memory 1508, each described above with reference to FIG. 16. The non-carrier location server 420 also includes a non-carrier observed time difference of arrival (OTDOA) library 1520. The memory 1508 includes code to be executed by the processor for: (1) extracting OTDOA assistance data and seed locations from the non-carrier OTDOA library 1520, wherein the OTDOA assistance data comprises an expected time difference of arrival of signals at a seed location from a pair of base stations; (2) computing locations from the OTDOA assistance data, wherein the locations comprise a location for each base station of the pair of base stations; and (3) saving the locations to the base station almanac.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FP- GAs), processors, controllers, micro-controllers, microprocessors, electronic devices, other electronic units designed to perform the functions described herein, or a combination thereof.

For a firmware and/or software implementation, the methodologies may be implemented with modules (e.g., code, procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device to facilitate the building of a base station almanac, the method comprising:
   sending a seed location from the mobile device to a first location server requesting observed time difference of arrival (OTDOA) assistance data;
   receiving, at the mobile device, the OTDOA assistance data from the first location server; and
   sending, from the mobile device, the OTDOA assistance data and the seed location to a second location server for building the base station almanac.

2. The method of claim 1, wherein the first location server comprises a location server operated by a network operator of the mobile device.

3. The method of claim 1, wherein the second location server comprises a location server disassociated from a network operator of the mobile device.

4. The method of claim 1, wherein the seed location comprises a coarse location.

5. The method of claim 1, wherein the seed location comprises a GPS location.

6. The method of claim 1, wherein the seed location comprises a externally generated location.

7. A mobile device for facilitating building of a base station almanac, the mobile device comprising:
   a receiver; and
   a processor comprising a memory and coupled to the receiver;
   wherein the memory comprises code to be executed by the processor for:
      sending a seed location from the mobile device to a first location server requesting observed time difference of arrival (OTDOA) assistance data;
      receiving, at the mobile device, the OTDOA assistance data from the first location server; and
      sending, from the mobile device, the OTDOA assistance data and the seed location to a second location server for building the base station almanac.

8. The mobile device of claim 7, wherein the second location server comprises a location server disassociated from a network operator of the mobile device.

9. The mobile device of claim 7, wherein the seed location comprises a coarse location.

10. The mobile device of claim 7, wherein the seed location comprises a GPS location.

11. The mobile device of claim 7, wherein the seed location comprises a externally generated location.

12. A mobile device for facilitating building of a base station almanac, the mobile device comprising:
   means for sending a seed location from the mobile device to a first location server requesting observed time difference of arrival (OTDOA) assistance data;
   means for receiving, at the mobile device, the OTDOA assistance data from the first location server; and
   means for sending, from the mobile device, the OTDOA assistance data and the seed location to a second location server for building the base station almanac.

13. The mobile device of claim 12, wherein the seed location comprises a coarse location.

14. The mobile device of claim 12, wherein the seed location comprises a externally generated location.

15. A computer-readable storage medium including non-transient program code stored thereon for:
   sending a seed location from the mobile device to a first location server requesting observed time difference of arrival (OTDOA) assistance data;
   receiving, at a mobile device, the OTDOA assistance data from the first location server; and
   sending, from the mobile device, the OTDOA assistance data and the seed location to a second location server for building a base station almanac.

16. A method in a non-carrier location server for building a base station almanac, the method comprising:
   receiving, at the non-carrier location server, observed time difference of arrival (OTDOA) assistance data and a seed location from a mobile device, wherein the OTDOA assistance data was received by the mobile device from a first location server distinct from the non-carrier location server; and saving, at the non-carrier location server, the OTDOA assistance data and the seed location to a non-carrier OTDOA library for building the base station almanac;

wherein the OTDOA assistance data comprises an expected time difference of arrival of signals at a seed location from a pair of base stations.

17. The method of claim 16, wherein the first location server comprises a location server provided by a network operator of the mobile device.

18. The method of claim 16, wherein the non-carrier location server comprises a location server disassociated from a network operator of the mobile device.

19. The method of claim 16, further comprising:
extracting the OTDOA assistance data and seed locations from the non-carrier OTDOA library;
computing locations based in part on the OTDOA assistance data, wherein the locations comprise a location for each base station of the pair of base stations; and
saving the locations to the base station almanac.

20. The method of claim 19, wherein computing the locations comprises computing a location for each base station of a plurality of pairs of base stations.

21. The method of claim 19, wherein computing the locations comprises solving a system of equations wherein:
known variables comprise at least five different seed locations and the expected time difference of arrival of signals for each of the at least five different seed locations; and
unknown variables comprise the locations of the pair of base stations and a time difference between the pair of base stations.

22. A non-carrier location server for building a base station almanac, the non-carrier location server comprising:
means for receiving, at the non-carrier location server, observed time difference of arrival (OTDOA) assistance data and a seed location from a mobile device, wherein the OTDOA assistance data was received by the mobile device from a first location server distinct from the non-carrier location server; and
means for saving, at the non-carrier location server, the OTDOA assistance data and the seed location to a non-carrier OTDOA library for building the base station almanac;
wherein the OTDOA assistance data comprises an expected time difference of arrival of signals at a seed location from a pair of base stations.

23. The non-carrier location server of claim 22, wherein the first location server comprises a location server provided by a network operator of the mobile device.

24. The non-carrier location server of claim 22, wherein the non-carrier location server comprises a location server disassociated from a network operator of the mobile device.

25. The non-carrier location server of claim 22, further comprising:
means for extracting the OTDOA assistance data and seed locations from the non-carrier OTDOA library;
means for computing locations based in part on the OTDOA assistance data, wherein the locations comprise a location for each base station of the pair of base stations; and
means for saving the locations to the base station almanac.

26. A non-carrier location server comprising a processor and a memory wherein the memory includes code to be executed by the processor for:
receiving, at the non-carrier location server, observed time difference of arrival (OTDOA) assistance data and a seed location from a mobile device, wherein the OTDOA assistance data was received by the mobile device from a first location server distinct from the non-carrier location server; and
saving, at the non-carrier location server, the OTDOA assistance data and the seed location to a non-carrier OTDOA library for building a base station almanac;
wherein the OTDOA assistance data comprises an expected time difference of arrival of signals at a seed location from a pair of base stations.

27. A computer-readable storage medium including non-transient program code stored thereon for:
receiving, at a non-carrier location server, observed time difference of arrival (OTDOA) assistance data and a seed location from a mobile device, wherein the OTDOA assistance data was received by the mobile device from a first location server distinct from the non-carrier location server; and
saving, at the non-carrier location server, the OTDOA assistance data and the seed location to a non-carrier OTDOA library for building a base station almanac;
wherein the OTDOA assistance data comprises an expected time difference of arrival of signals at a seed location from a pair of base stations.

28. A method in a non-carrier location server comprising a non-carrier observed time difference of arrival (OTDOA) library and for building a base station almanac, the method comprising:
extracting OTDOA assistance data and seed locations from the non-carrier OTDOA library, wherein the OTDOA assistance data comprises an expected time difference of arrival of signals at a seed location from a pair of base stations;
computing locations from the OTDOA assistance data, wherein the locations comprise a location for each base station of the pair of base stations; and
saving the locations to the base station almanac.

29. The method of claim 28, wherein computing the locations comprises computing a location for each base station of a plurality of pairs of base stations.

30. The method of claim 28, wherein computing the locations comprises solving a system of equations wherein:
known variables comprise at least five different seed locations and the expected time difference of arrival of signals for each of the at least five different seed locations; and
unknown variables comprise the locations of the pair of base stations and a time difference between the pair of base stations.

31. A non-carrier location server for building a base station almanac, the non-carrier location server comprising:
a non-carrier observed time difference of arrival (OTDOA) library; and
processor and a memory comprising code in the memory to be executed by the processor for:
extracting OTDOA assistance data and seed locations from the non-carrier OTDOA library, wherein the OTDOA assistance data comprises an expected time difference of arrival of signals at a seed location from a pair of base stations;

computing locations from the OTDOA assistance data, wherein the locations comprise a location for each base station of the pair of base stations; and saving the locations to the base station almanac.

32. A non-carrier location server for building a base station almanac, the non-carrier location server comprising:

means for extracting observed time difference of arrival (OTDOA) assistance data and seed locations from a non-carrier OTDOA library, wherein the OTDOA assistance data comprises an expected time difference of arrival of signals at a seed location from a pair of base stations;

means for computing locations from the OTDOA assistance data, wherein the locations comprise a location for each base station of the pair of base stations; and means for saving the locations to the base station almanac.

33. A non-carrier location server for building a base station almanac, comprising a processor and a memory coupled to a non-carrier observed time difference of arrival (OTDOA) library, wherein the memory includes code to be executed by the processor for:

extracting OTDOA assistance data and seed locations from the non-carrier OTDOA library, wherein the OTDOA assistance data comprises an expected time difference of arrival of signals at a seed location from a pair of base stations;

computing locations from the OTDOA assistance data, wherein the locations comprise a location for each base station of the pair of base stations; and saving the locations to the base station almanac.

34. A computer-readable storage medium including non-transient program code stored thereon to be executed by a processor for:

extracting observed time difference of arrival (OTDOA) assistance data and seed locations from a non-carrier OTDOA library, wherein the OTDOA assistance data comprises an expected time difference of arrival of signals at a seed location from a pair of base stations;

computing locations from the OTDOA assistance data, wherein the locations comprise a location for each base station of the pair of base stations; and saving the locations to a base station almanac.

35. A position determination method in a mobile device, the position determination method comprising:

sending a seed location from the mobile device to a non-carrier location server, wherein:

the non-carrier location server is distinct from a network providing service to the mobile device and distinct from a carrier's location server that offers service to the mobile device, and the non-carrier location server comprises a non-carrier observed time difference of arrival (OTDOA) library and a base station almanac;

receiving, at the mobile device, at least part of the base station almanac from the non-carrier location server, wherein the base station almanac was derived at least in part from observed time difference of arrival (OTDOA) assistance data from the carrier's location server; and computing a position estimate of the mobile device based on the at least part of the base station almanac.

36. The position determination method of claim 35, wherein the part of the base station almanac received by the mobile device comprises a location of neighboring base stations.

37. The position determination method of claim 36, wherein the location of neighboring base stations comprises the location of neighboring base stations for a combination of networks, including the network providing service to the mobile device.

38. The position determination method of claim 35, wherein computing the position estimate of the mobile device based on the at least part of the base station almanac further comprises measuring a time of arrival, at the mobile device, of a reference signal from one or more of neighboring base stations.

39. A mobile device comprising a transmitter and receiver;

a processor comprising a memory and coupled to the transmitter and to the receiver;

wherein the memory comprises code to be executed by the processor for:

sending a seed location from the mobile device to a non-carrier location server, wherein:

the non-carrier location server is distinct from a network providing service to the mobile device and distinct from a carrier's location server that offers service to the mobile device, and the non-carrier location server comprises a non-carrier observed time difference of arrival (OTDOA) library and a base station almanac;

receiving, at the mobile device, at least part of the base station almanac from the non-carrier location server, wherein the base station almanac was derived at least in part from observed time difference of arrival (OTDOA) assistance data from the carrier's location server; and computing a position estimate of the mobile device based on the at least part of the base station almanac.

40. The mobile device of claim 39, wherein the part of the base station almanac received by the mobile device comprises location of neighboring base stations.

41. The mobile device of claim 40, wherein the location of neighboring base stations comprises the location of neighboring base stations for a combination of networks, including the network providing service to the mobile device.

42. The mobile device of claim 39, wherein the code for computing the position estimate of the mobile device based on the at least part of the base station almanac further comprises measuring a time of arrival, at the mobile device, of a reference signal from one or more of neighboring base stations.

43. A mobile device configured for position determination operations, the mobile device comprising:

means for sending a seed location from the mobile device to a non-carrier location server, wherein:

the non-carrier location server is distinct from a network providing service to the mobile device and distinct from a carrier's location server that offers service to the mobile device, and the non-carrier location server comprises a non-carrier observed time difference of arrival (OTDOA) library and a base station almanac;

means for receiving, at the mobile device, at least part of the base station almanac from the non-carrier location server, wherein the base station almanac was derived at least in part from observed time difference of arrival (OTDOA) assistance data from the carrier's location server; and means for computing a position estimate of the mobile device based on the at least part of the base station almanac.

44. A non-transitory computer-readable storage medium comprising program code stored thereon to be executed by a processor for:
  sending a seed location from a mobile device to a non-carrier location server, wherein:
    the non-carrier location server is distinct from a network providing service to the mobile device and distinct from a carrier's location server that offers service to the mobile device, and
    the non-carrier location server comprises a non-carrier observed time difference of arrival (OTDOA) library and a base station almanac;
  receiving, at the mobile device, at least part of the base station almanac from the non-carrier location server, wherein the base station almanac was derived at least in part from observed time difference of arrival (OTDOA) assistance data from the carrier's location server; and
  computing a position estimate of the mobile device based on the at least part of the base station almanac.

* * * * *